E. M. KINNE.

HARNESS SADDLE-TREE.

No. 6,960. Reissued Feb. 29, 1876.

Witnesses:
Grenville Lewis
Martin Van Ness

Inventor
E. M. Kinne
p. C. M. Parks
Attorney.

N. PETERS, PHOTO-LITHOGRAPHER, WASHINGTON, D. C.

UNITED STATES PATENT OFFICE.

ERASTUS M. KINNE, OF CUBA, NEW YORK.

IMPROVEMENT IN HARNESS-SADDLE TREES.

Specification forming part of Letters Patent No. 150,865, dated May 12, 1874; reissue No. 6,960, dated February 29, 1876; application filed February 2, 1876.

*To all whom it may concern:*

Be it known that I, ERASTUS M. KINNE, of Cuba, in the county of Allegany and State of New York, have invented certain new and useful Improvements in Harness-Saddle Trees; and I do hereby declare that the following is a full, clear, and exact description thereof, reference being had to the accompanying drawings, and to the letters of reference marked thereon, which form part of this specification.

The nature of my invention consists in the construction and arrangement of a harness-saddle in which the jockey, tree, and seat are detachable from the body of the saddle, as will be hereinafter more fully set forth.

In order to enable others skilled in the art to which my invention appertains to make and use the same, I will now proceed to describe its construction and operation, referring to the annexed drawings, in which—

Figure 1:
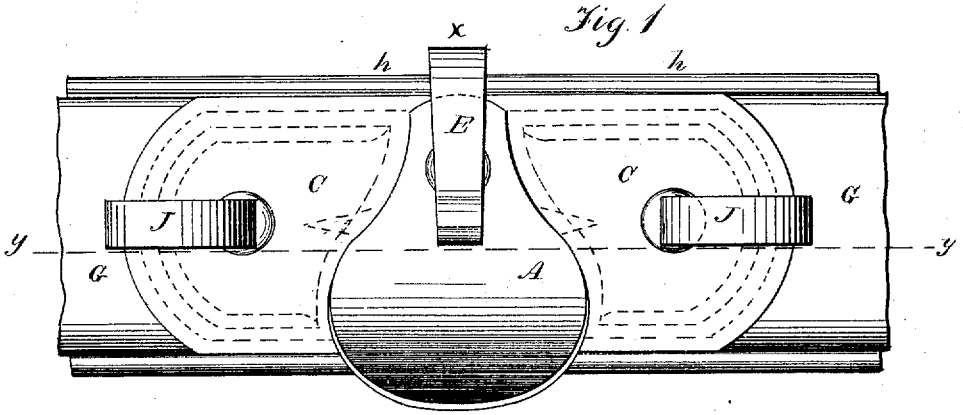
Figure 2:
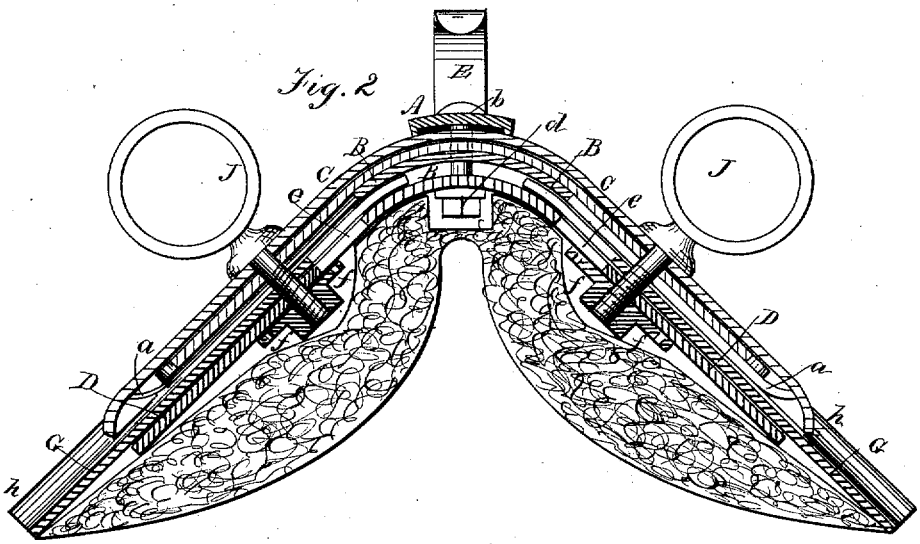
Figure 3:
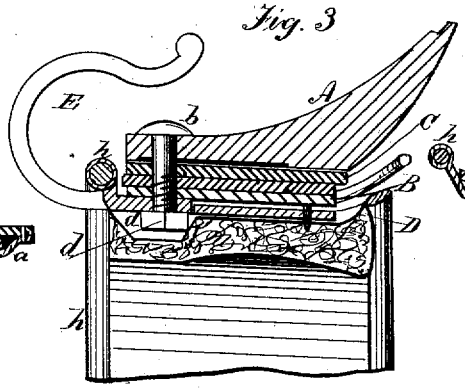
Figure 4:
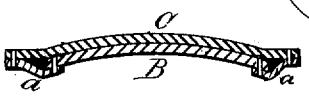
Figure 5:
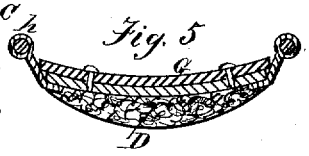

Figure 1 is a plan view of my improved harness-saddle. Fig. 2 is a longitudinal section of the same through the line *y y* of Fig. 1; and Fig. 3 is a transverse section through the line *x x*, Fig. 1. Fig. 4 is a section of the tree, showing the mode of attaching the jockey thereto; and Fig. 4 is a cross-section through one end of the saddle-tree.

A represents the seat, which may be made in any of the known and usual ways. B is the jockey iron or tree, and C is the jockey-top. On the under side of the tree B, along the outer edges, are riveted strips *a*, of leather, and through these strips the jockey C is stitched. The inner or under side of the tree is concave, so that the edges of the jockey are brought down on an angle with the concavity of the tree. The seat, jockey, and tree are united together by means of a bolt, *b*, passing down from the top through the front edge, guided by a suitable pin in the rear, as shown. The inner end of the check-hook E is placed over the lower end of the bolt *b*, and the whole fastened by a nut, *d*. D represents the pad-iron, and G the skirts tacked or otherwise fastened thereto. The pad-iron D is concave transversely on its upper side, and the skirt G is brought down into said concavity, causing the outer edge of the skirt to be brought to an angle with the concavity, thus leaving room for the bearer of the saddle to pass through to the terrets. In the pad-iron are slots *e*, just above the terret-holes, to admit the nuts *f* belonging to the terrets, which nuts can be taken out at will when the terrets are out.

When the tree covered with the jockey is put into its position by passing the check-hook E through a slot under the front bead *h* in the saddle-body, and the terrets J J are put in and screwed down, the outer edges of the jockey and skirt are pressed tightly together, just as if the jockey were stitched to the skirt in the old style, owing to the concavities of the tree and pad-iron facing each other, and being brought tight by the terrets.

This invention, as far as having the jockey detachable from the body of the saddle and the slots in the pad-iron, may be applied to trees that have an iron jockey without any covering.

By this construction the tree can easily be taken off and the check-hook changed. The pad may be laced over on top of the skirt, where the jockey covers it, which is of great advantage, as they always lace on harder at that point than any other part.

If the jockey gets injured in any way it can be taken off and repaired at very little expense.

Having thus fully described my invention, what I claim as new, and desire to secure by Letters Patent, is—

1. The combination of the concave tree B, the leather strips *a a* riveted thereto along the edges, and the jockey C stitched to said strips, all constructed substantially as and for the purposes herein set forth.

2. The combination of the concave tree B and jockey C with the concave pad-iron D and skirt G, the parts being connected together as and for the purpose set forth.

3. A gig-saddle tree consisting of two concave parts secured together by the terrets, with their concave sides facing each other, substantially as described.

4. A gig-saddle tree constructed substantially in the manner described, with the jockey tree and top seat and check-hook complete, detachable from the skirt, as set forth.

5. The concave pad-iron D, provided with holes for the terret-shanks, holes for the admission of the nuts, and a centering-pin, in combination with the detachable concave tree B, covered by the jockey C, and provided with similar holes to be securely attached to the pad by the terrets, substantially as described.

The above specification of my said invention signed and witnessed at Cuba, New York, this 21st day of December, A. D. 1875.

ERASTUS M. KINNE.

Witnesses:
RUFUS W. KINNE,
EDWIN R. NASH.